(12) United States Patent
Haruhara

(10) Patent No.: US 11,649,363 B2
(45) Date of Patent: May 16, 2023

(54) OIL-BASED INK COMPOSITION FOR WRITING INSTRUMENT

(71) Applicant: Mitsubishi Pencil Company, Limited, Tokyo (JP)

(72) Inventor: Yumiko Haruhara, Yokohama (JP)

(73) Assignee: Mitsubishi Pencil Company, Limited, Tokyo (JP)

( * ) Notice: Subject to any disclaimer, the term of this patent is extended or adjusted under 35 U.S.C. 154(b) by 697 days.

(21) Appl. No.: 16/608,982

(22) PCT Filed: Mar. 9, 2018

(86) PCT No.: PCT/JP2018/009316
§ 371 (c)(1),
(2) Date: Oct. 28, 2019

(87) PCT Pub. No.: WO2018/216315
PCT Pub. Date: Nov. 29, 2018

(65) Prior Publication Data
US 2020/0190346 A1    Jun. 18, 2020

(30) Foreign Application Priority Data
May 22, 2017    (JP) .............................. JP2017-100995

(51) Int. Cl.
*C09D 11/16* (2014.01)
*B43K 8/03* (2006.01)
*C09D 1/00* (2006.01)
*C09D 11/00* (2014.01)
*C09D 13/00* (2006.01)
*C09D 11/02* (2014.01)

(52) U.S. Cl.
CPC ................. *C09D 11/16* (2013.01); *B43K 8/03* (2013.01)

(58) Field of Classification Search
USPC .................................. 106/31.01, 31.13, 31.6
See application file for complete search history.

(56) References Cited

U.S. PATENT DOCUMENTS

| 2003/0041776 A1 | 3/2003 | Spencer et al. |
| 2006/0063856 A1 | 3/2006 | Cordova |

FOREIGN PATENT DOCUMENTS

| CN | 106687484 A | * | 5/2017 | ................ C08F 2/26 |
| EP | 3330095 A1 | * | 6/2018 | ......... B41M 5/0047 |
| JP | 2006-124456 A | | 5/2006 | |
| JP | 2008-208290 A | | 9/2008 | |
| JP | 2008-208292 A | | 9/2008 | |
| JP | 2008208290 A | * | 9/2008 | |
| JP | 2008208292 A | * | 9/2008 | |
| JP | 2012-240916 A | | 12/2012 | |
| JP | 2013-095846 A | | 5/2013 | |

* cited by examiner

*Primary Examiner* — James E McDonough
(74) *Attorney, Agent, or Firm* — Foley & Lardner LLP

(57) ABSTRACT

Provided is an oil-based ink composition for writing instruments which has good properties for writing on writing surfaces of various materials and which has improved friction resistance against friction from retracing of letters that have already been written and against stronger friction forces.

4 Claims, 2 Drawing Sheets

(a)

(b)

(a)

(b)

OIL-BASED INK COMPOSITION FOR WRITING INSTRUMENT

CROSS-REFERENCE TO RELATED APPLICATIONS

This application is the U.S. National Stage of PCT/JP2018/009316, filed Mar. 9, 2018, which claims priority to JP 2017-100995, filed May 22, 2017.

FIELD

The present invention relates to an oil-based ink composition for writing instruments.

Conventionally, regarding oil-based inks used in permanent markers, the adhesion of the written marks formed on writing surfaces of various materials is required. In particular, the oil-based inks are required to prepare written marks having sufficient adhesion even on materials with poor wettability, such as, synthetic resin films, paper coated with resin, and metals, etc. Additionally, the oil-based inks are required to be free from cissing when written marks are formed on writing surfaces of various materials as indicated above.

In order to satisfy these requirements, PTL 1 proposes an oil-based ink composition for writing instruments comprising at least a colorant, an organic solvent, a resin, and a double-end modified polyether-modified silicone.

CITATION LIST

Patent Literature

[PTL 1] Japanese Unexamined Patent Publication (Kokai) No. 2008-208292

SUMMARY

Technical Problem

According to PTL 1, a practical oil-based ink composition for writing instruments, in which no cissing is found in written marks formed on writing surfaces of various materials, whereby good written marks can be formed, and in which written marks have superior adhesion, can be provided. However, an improvement may be necessary because this oil-based ink composition for writing instruments is vulnerable to repeated or forceful rubbing.

Therefore, there is a need to provide an oil-based ink composition for writing instruments which maintains good writability on writing surfaces of various materials, and demonstrates improved anti-rubbing characteristics against repeated or forceful rubbing of the written marks.

Solution to Problem

The present inventors engaged in keen examination in order to achieve the above object. As a result, they discovered that the following means achieves the above object, and completed the invention:

<1> An oil-based ink composition for writing instruments, comprising a colorant, a resin, an organic solvent, and a polydimethylsiloxane,
wherein the polydimethylsiloxane has polyether-modifying groups on both ends, and the total sum of hydroxy groups of the polyether-modifying groups is 3 or more.

<2> The oil-based ink composition for writing instruments according to <1>, wherein at least one of the polyether-modifying groups has a multi-branched molecular skeleton.

<3> The oil-based ink composition for writing instruments according to <1> or <2>, wherein the content of the polydimethylsiloxane is 0.005 to 10 mass % relative to the total mass of the oil-based ink composition for writing instruments.

<4> An oil-based ink composition for writing instruments, comprising a colorant, a resin, an organic solvent, and a friction reducing agent,
wherein a coated film formed by applying 3 μm of the oil-based ink composition for writing instruments on a polypropylene film followed by drying has a coefficient of friction of 0.13 or less as measured according to ASTM D1894.

<5> A writing instrument comprising at least an ink storage portion, a writing portion, and a holding portion,
wherein the oil-based ink compositions for writing instruments according to any one of <1> to <4> is stored in the ink storage portion.

Advantageous Effects of Inventions

According to the present invention, it is possible to provide an oil-based ink composition for writing instruments which maintains good writability on writing surfaces of various materials, and demonstrates improved anti-rubbing characteristics against repeated or forceful rubbing of the written marks.

BRIEF DESCRIPTION OF DRAWINGS

FIG. 1 (b) is a schematic drawing representing the coated film formed from the oil-based ink composition for writing instruments of the present invention after the application of a frictional force.

FIG. 2 (b) is a schematic drawing representing the film formed from a conventional oil-based ink composition for writing instruments after the application of a frictional force.

DESCRIPTION OF EMBODIMENTS

<<Oil-Based Ink Composition for Writing Instruments>>

Figure 1:
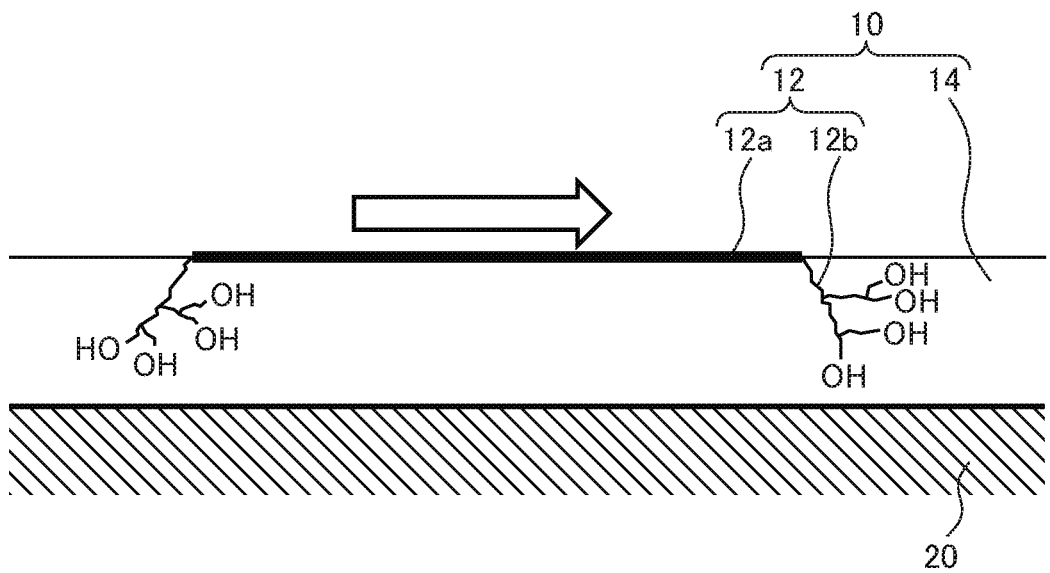
FIG. 1 (a) is a schematic drawing representing a coated film formed from the oil-based ink composition for writing instruments of the present invention before the application of a frictional force.
Figure 1:
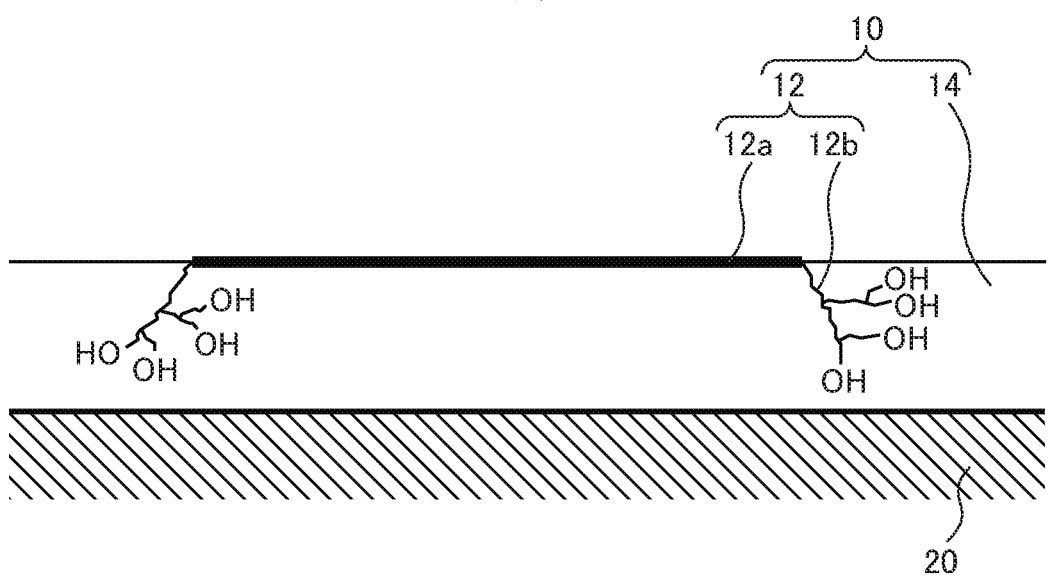

The oil-based ink composition for writing instruments of the present invention comprises a colorant, a resin, an organic solvent, and a friction reducing agent, particularly, a polydimethylsiloxane. The polydimethylsiloxane has polyether-modifying groups on both ends, and the total number of hydroxy groups of the polyether-modifying groups is 3 or more.

As described above regarding PTL 1, oil-based ink compositions for writing instruments comprising a polydimethylsiloxane having a polyether-modifying group on each end are considered to demonstrate good adhesion of written marks made on materials with poor wettability. In other words, it is considered that, conventionally, improving the wettability of ink compositions on the writing surface to improve the adhesion at the boundary between the writing surface and the ink composition has been pursued as a means for improving the adhesion of written marks.

In contrast to this, the present inventors focused anew on the surfaces of ink compositions after writing on writing surfaces. Specifically, the present inventors discovered that by reducing the coefficient of friction of a written mark after writing on a writing surface, a frictional force applied to the written mark is reduced, thereby the anti-rubbing characteristics of the mark can be improved.

Reducing the coefficient of friction of a written mark, as described above, can be achieved by retaining, in particular, the main chain of a polydimethylsiloxane on the surface of the written mark. The foregoing is explained with reference to FIGS. 1 and 2.

Regarding conventional oil-based ink compositions for writing instruments, wettability of the ink composition relative to the writing surface is good when writing on a writing surface, and thereby adhesion is improved. Additionally, as shown in FIG. 2 (a), on the surface of adhered component (14) comprising a colorant, a resin, and an organic solvent, the polyether-modifying group (12b) of the polydimethylsiloxane (12) has an affinity for the adhered component (14) through a hydroxy group, and the main chain (12a) is exposed on the surface of the oil-based ink composition for writing instruments (10).

Figure 2:
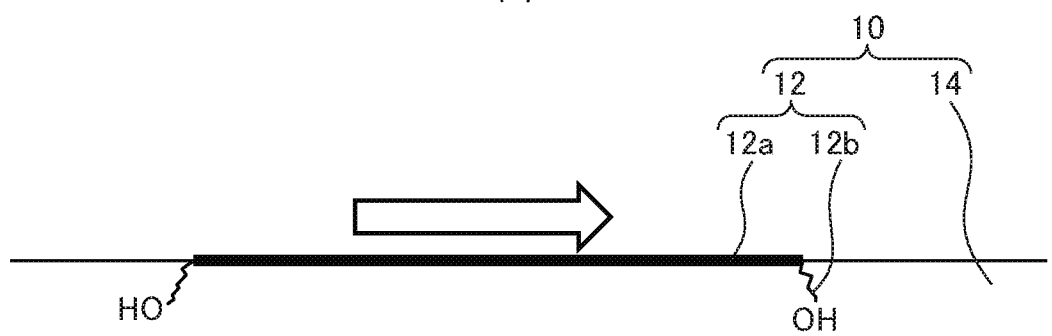
FIG. 2 (a) is a schematic drawing representing a film formed from a conventional oil-based ink composition for writing instruments before the application of a frictional force.
Figure 2:
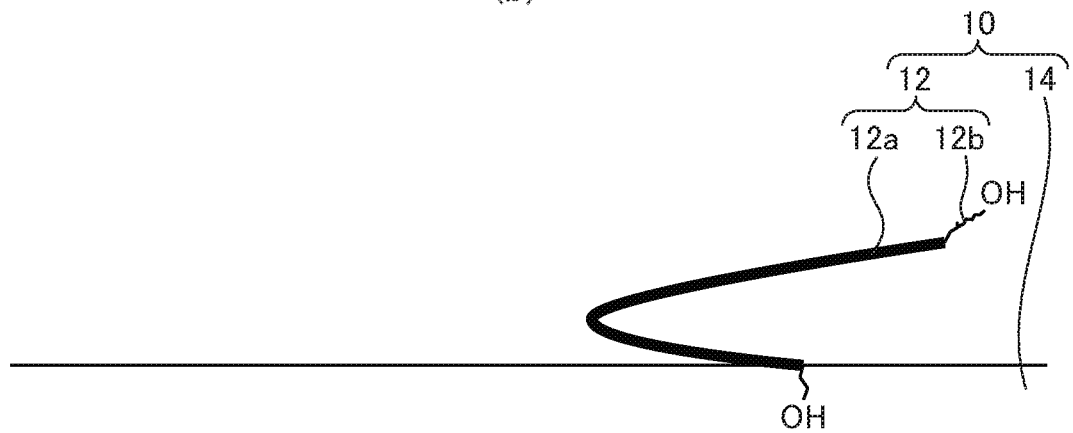

However, when a frictional force is applied in the direction indicated by the arrow of FIG. 2 (a), the polydimethylsiloxane (12) can be physically removed, as shown in FIG. 2 (b), and as a result, the entire oil-based ink composition for writing instruments (10) could be removed from the writing surface (20).

In contrast, in the oil-based ink composition for writing instruments of the present invention, as shown in FIG. 1 (a), the polyether-modifying group (12b) has a plurality of hydroxy groups. It is believed that the polydimethylsiloxane (12) thereby has a strong affinity for the adhered component (14). It is further believed that, as a result, even if a frictional force is applied in the direction of the arrow of FIG. 1 (a), the main chain (14a) of the polydimethylsiloxane (12) is retained on the surface of the oil-based ink composition for writing instruments (10), and the coefficient of friction of the written mark is lower due to the presence of the main chain (14a), such that the written mark cannot be easily removed by friction.

The above configuration enables the achievement of improved anti-rubbing characteristics of written marks after writing while maintaining good writability on writing surfaces of various materials due to the presence of polyether-modifying groups.

The content of the polydimethylsiloxane in the oil-based ink composition for writing instruments of the present invention is preferably 0.005 to 10 mass %, from the perspective of achieving both functions above. This content is preferably 0.005 mass % or more, 0.010 mass % or more, 0.050 mass % or more, 0.100 mass % or more, 0.300 mass % or more, or 0.500 mass % or more, from the perspective of ensuring a sufficient amount of the polydimethylsiloxane present on the surface of a writing mark such that anti-rubbing characteristics are improved. The content is preferably 10 mass % or less, 8 mass % or less, or 5 mass % or less, from the perspective of achieving adhesion of the oil-based ink composition for writing instruments to writing surfaces.

The content of the colorant in the oil-based ink composition for writing instruments of the present invention can be 1 mass % or more, 2 mass % or more, 3 mass % or more, or 5 mass % or more, and 25 mass % or less, 20 mass % or less, or 15 mass % or less.

The content of the resin in the oil-based ink composition for writing instruments of the present invention can be 1 mass % or more, 2 mass % or more, 3 mass % or more, or 5 mass % or more, and 25 mass % or less, 20 mass % or less, or 15 mass % or less.

A coated film formed by applying 3 µm of the oil-based ink composition for writing instruments on a polypropylene film followed by drying may have a coefficient of friction of 0.13 or less as measured according to ASTM D1894. The coefficient of friction may be measured, for example, by a surface measuring instrument (HEIDON-14D, Shinto Scientific Co., Ltd.) with a load of 100 g, a moving rate of 3.3 m/min, and an angle of 90°. The coefficient of friction may be 0.13 or less, or 0.12 or less, and 0.01 or more, 0.03 or more, 0.05 or more, or 0.07 or more.

Each of the components of the present invention will be explained below.

<Colorant>

The colorant can be any of various colorants used in conventional inks, such as a dye, a pigment or a mixture of a dye and a pigment.

The dye that can be used in the present invention can be any of dyes used in normal dye ink compositions, such as a direct dye, an acidic dye, a basic dye, a mordant/acid mordant dye, a spirit soluble dye, an azoic dye, a sulfur/sulfur vat dye, a vat dye, a disperse dye, an oil-soluble dye, a food dye, a metal complex dye, a salt-forming dye, a dye of dyed resin or any aqueous solution thereof.

The pigment that can be used in the present invention can be an inorganic pigment such as carbon black, graphite, or titanium dioxide; a constitutional pigment such as talc, silica, alumina, mica, or alumina silicate; an organic pigment such as an azo pigment, a condensed azo pigment, a phthalocyanine pigment, an anthraquinone pigment, a quinacdrine pigment, an isoindolinone pigment, a diketopyrrolopyrrole pigment, or any of various lake pigments; a fluorescent pigment; a pearl pigment; or a metallic pigment such as a gold or silver metallic pigment.

One or a mixture of the above dyes and pigments can be used as the colorant in the present invention.

<Resin>

The resin can be a ketone resin, sulfoamide resin, maleic acid resin, terpene resin, terpene phenol resin, ester gum, xylene resin, alkyd resin, phenol resin, rosin, polyvinyl pyrrolidone, polyvinyl butyral, polyvinyl alcohol, acrylic resin, melamine resin, cellulose resin, or a derivative thereof <Organic Solvent>

The organic solvent can be, for example, an aromatic compound, an alcohol, a polyalcohol, a glycol ether, a hydrocarbon, or an ester. The above solvents can be used individually or in combination.

The aromatic compound can be, for example, benzyl alcohol, ethylene glycol monophenyl ether, ethylene glycol monobenzyl ether, propylene glycol monophenyl ether, diethylene glycol monophenyl ether, alkyl sulfonic acid phenyl ester, butyl phthalate, ethyl hexyl phthalate, tridecyl phthalate, ethyl hexyl trimellirate, diethylene glycol dibenzoate, or dipropylene glycol dibenzoate, etc.

The alcohol can be, for example, ethanol, n-propanol, isopropanol, n-butanol, isobutanol, tert-butyl alcohol, 1-pentanol, isoamyl alcohol, sec-amyl alcohol, 3-pentanol, tert-amyl alcohol, n-hexanol, methyl amyl alcohol, 2-ethylbutanol, n-heptanol, 2-heptanol, 3-heptanol, n-octanol, 2-octanol, 2-ethylhexanol, 3,5,5-trimethylhexanol, nonanol, n-decanol, undecanol, n-decanol, trimethylnonyl alcohol, tetradecanol, heptadecanol, cyclohexanol, or 2-methylcyclohexanol, etc.

The polyalcohol can be, for example, ethylene glycol, diethylene glycol, 3-methyl-1,3-butanediol, triethylene glycol, dipropylene glycol, 1,3-propanediol, 1,3-butanediol, 1,5-pentanediol, hexylene glycol, or octylene glycol, etc.

The glycol ether can be, for example, methyl isopropyl ether, ethyl ether, ethyl propyl ether, ethyl butyl ether, isopropyl ether, butyl ether, hexyl ether, 2-ethylhexyl ether, ethylene glycol monohexyl ether, ethylene glycol mono-2-ethylbutyl ether, ethylene glycol monomethyl ether, ethylene glycol mono ethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monobutyl ether, 3-methyl-3-methoxy-1-butanol, 3-methoxy-1-butanol, propylene glycol monomethyl ether, propylene glycol monoethyl ether, propylene glycol monopropyl ether, propylene glycol monobutyl ether, propylene glycol tertiary butyl ether dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether, or tetrapropylene glycol monobutyl ether, etc.

The hydrocarbon can be, for example, a linear hydrocarbon such as hexane, isohexane, heptane, octane, nonane, or decane, or a cyclic hydrocarbon such as cyclohexane, methylcyclohexane, or ethylcyclohexane.

The ester can be, for example, propylene glycol methyl ether acetate, propylene glycol diacetate, 3-methyl-3-methoxybutyl acetate, propylene glycol ethyl ether acetate, ethylene glycol ethyl ether acetate, butyl formate, isobutyl formate, isoamyl formate, propyl acetate, butyl acetate, isopropyl acetate, isobutyl acetate, isoamyl acetate, methyl propionate, ethyl propionate, propyl propionate, isobutyl propionate, isoamyl propionate, methyl butyrate, ethyl butyrate, propyl butyrate, methyl isobutyrate, ethyl isobutyrate, propyl isobutyrate, methyl valerate, ethyl valerate, propyl valerate, methyl isovalerate, ethyl isovalerate, propyl isovalerate, methyl trimethyl acetate, ethyl trimethyl acetate, propyl trimethyl acetate, methyl caproate, ethyl caproate, propyl caproate, methyl caprylate, ethyl caprylate, propyl caprylate, methyl laurate, ethyl laurate, methyl oleate, ethyl oleate, triglyceride caprylate, tributyl acetate citrate, octyl oxystearate, propylene glycol monoricinoleate, methyl 2-hydroxyisobutyrate, or 3-methoxybutyl acetate, etc.

<Friction Reducing Agent>

The friction reducing agent is a component contained in the oil-based ink composition for writing instruments of the present invention. A coated film formed by applying 3 μm of oil-based ink composition comprising a friction reducing agent for writing instruments of the present invention on a polypropylene film followed by drying can have a coefficient of friction of 0.13 or less, as measured according to ASTM D1894. The above friction reducing agent can be, for example, the following polydimethylsiloxane.

<Friction Reducing Agent: Polydimethylsiloxane>

Polydimethylsiloxane is a compound having the general formula below.

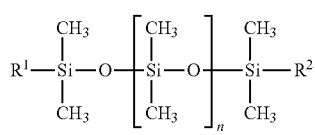
[Chem 1]

In particular, the polydimethylsiloxane in the oil-based ink composition for writing instruments of the present invention has a polyether-modifying group at each end thereof, i.e., at the $R^1$ and $R^2$ positions in the general formula above.

It is preferable that at least one of the polyether-modifying groups has a multi-branched molecular skeleton, whereby the number of hydroxy groups increases, thereby improving the anti-rubbing characteristics of the coated film.

The total number of hydroxy groups in the polyether-modifying groups is 3 or more. The total number can be 5 or more, 7 or more, or 10 or more, and 100 or less, 80 or less, 50 or less, 40 or less, and 30 or less.

For the polydimethylsiloxane, for example, "BYK-SILCLEAN 3720" of BYK Co., Ltd., or "Protect 5000N" of TEGO Co., Ltd. can be used.

{Polyether-Modifying Group}

The polyether-modifying group refers to a group that has, for example, at least the polyether structure below:

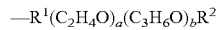
$$-R^1(C_2H_4O)_a(C_3H_6O)_bR^2$$

In the formula, $R^1$ represents an alkyl group having 1 to 10 carbon atoms, and $R^2$ represents a hydrogen atom, or an alkyl or aryl group having 1 to 50 carbon atoms. Additionally, a represents an integer from 1 to 50, and b represents an integer from 1 to 50.

In particular, the polyether-modifying group having a multi-branched molecular skeleton can have the above polyether structure in at least one branch. Further, such polyether-modifying group can have hydroxy groups on all or a portion of the ends of the branched portions, and as a result, the entirety of the polyether-modifying group can have a plurality of hydroxy groups.

(Multi-Branched Molecular Skeleton)

The atoms constituting the multi-branched molecular skeleton can be at least one of C, Si, O, and H.

The multi-branched molecular skeleton can have a plurality of branches, for example, 2 or more, 3 or more, 5 or more, 7 or more, or 10 or more, and 100 or less, 80 or less, 50 or less, or 30 or less branches.

<<Writing Instrument>>

The writing instrument of the present invention comprises at least an ink storage portion, a writing portion, and a holding portion. The aforementioned oil-based ink composition for writing instruments is stored in the ink storage portion. The writing instrument of the present invention may be a permanent marker or a ballpoint pen.

"Permanent marker" in the present specification refers to a pen having a structure that supplies ink stored in the ink storage portion to a writing portion made of a resin via capillary action, and encompasses pens referred to as "marking pens" in the art. Additionally, "ballpoint pen" in the present specification refers to a pen having a structure in which rotation of a ball in the writing portion results in leaking of the ink stored in the ink storage portion.

<Ink Storage Portion>

In the ink storage portion, the oil-based ink composition for writing instruments is stored.

The ink storage portion can be anything that stores ink and supplies the ink to the writing portion.

<Writing Portion>

The writing portion can comprise any materials in accordance with the use of the writing instrument. In the case of the present invention where the writing instrument is a permanent marker, the writing portion can be, for example, a fiber core or a plastic core. In the case where the writing instrument of the present invention is a ballpoint pen, the writing portion can comprise a ballpoint pen tip at the tip portion.

<<Method for Manufacturing an Oil-Based Ink Composition for Writing Instruments>>

The oil-based ink composition for writing instruments can be manufactured using a conventionally known method while mixing the colorant, resin, organic solvent, and polydimethylsiloxane using a mixer such as a Disper, etc.

EXAMPLES

The present invention will be specifically described by way of the Examples and Comparative Examples. However, the present invention is not limited thereto.

<<Preparing the Oil-Based Ink Composition for Writing Instruments>>

Example 1

A dye (Valifast Black 3830, Orient Chemical Co., Ltd., 12.5 mass parts) as a colorant, terpene phenol (YS Polystar145, Yasuhara Chemical Co., Ltd., 5 mass parts) as a resin, a hydroxy-containing polyether-modified polydimethylsiloxane (BYK-SILCLEAN 3720, BYK Co., Ltd., solid content 25%, soluble polypropylene glycol monoethyl ether (PGM), 4 mass parts (1 mass part of solid content and 3 mass parts of propylene glycol monoethyl ether)), and ethanol (61 mass parts) as a solvent, were mixed along with propylene glycol monoethyl ether (17.5 mass parts) by stirring to prepare 100 mass parts of the oil-based ink composition for writing instruments of Example 1.

Example 2

100 mass parts of the oil-based composition for writing instruments of Example 2 was prepared similarly to Example 1, except that the amount in mass parts of hydroxy-containing polyether-modified polydimethylsiloxane (BYK-SILCLEAN 3720, BYK Co., Ltd.) was altered to 12 mass parts (solid content 3 mass parts, propylene glycol monoethyl ether 9 mass parts), and the amount in mass parts of ethanol was altered to 53 mass parts.

Example 3

A dye (Spilon Red C-GH, Hodogaya Chemical Co., Ltd., 3.5 mass parts) as a colorant, terpene phenol (YS Polystar S145, Yasuhara Chemical Co., Ltd., 5 mass parts) as a resin, hydroxy-containing polyether-modified polydimethylsiloxane (Protect 5000N, TEGO, 3 mass parts (solid content)), and ethanol (80 mass parts) as a solvent were mixed along with propylene glycol monoethyl ether (8.5 mass parts) by stirring to prepare the oil-based ink composition for writing instruments of Example 3.

Example 4

100 mass parts of the oil-based composition for writing instruments of Example 4 was prepared similarly to Example 3, except that the amount in mass parts of hydroxy-containing polyether-modified polydimethylsiloxane (Protect 5000N, TEGO) was altered to 6 mass parts, and the amount in mass parts of ethanol was altered to 77 mass parts.

Comparative Example 1

The oil-based composition for writing instruments of Comparative Example 1 was prepared similarly to Example 1, except that double-end carbinol-modified polydimethylsiloxane (KF-6003, Shin-Etsu Chemical Co., Ltd., 3 mass parts) was used in place of hydroxy-containing polyether-modified polydimethylsiloxane (BYK-SILCLEAN 3720, BYK Co., Ltd.), and 62 mass parts of ethanol was used.

Comparative Example 2

The oil-based composition for writing instruments of Comparative Example 2 was prepared similarly to Example 1, except that PEG-32 methylether dimethicone (KF-6004, Shin-Etsu Chemical Co., Ltd., 3 mass parts) was used in place of hydroxy-containing polyether-modified polydimethylsiloxane (Protect 5000N, TEGO).

Comparative Example 3

A dye (Valifast Blue 1613, Orient Chemical Co., Ltd., 7.5 mass parts) as a colorant, terpene phenol (YS Polystar S145, Yasuhara Chemical Co., Ltd., 5 mass parts) as a resin, double-end polyether-modified polydimethylsiloxane (X-22-4952, Shin-Etsu Chemical Co., Ltd.), and ethanol (79.5 mass parts) as a solvent were mixed along with propylene glycol monoethyl ether (5 mass parts) by stirring to prepare the oil-based ink composition for writing instruments of Comparative Example 3.

Comparative Example 4

The oil-based composition for writing instruments of Comparative Example 4 was prepared similarly to Example 1, except that hydroxy-containing polyether-modified polydimethylsiloxane (BYK-SILCLEAN 3720, BYK) was not used and 65 mass parts of ethanol was used.

<<Preparing the Writing Instrument>>

The above oil-based ink compositions for writing instruments were inserted into Mitsubishi Pencils PA-121T (product name "Pi:S Marker", pen core: fine round core (acrylic fiber core)) to prepare permanent markers. Thereafter, writability, anti-rubbing characteristics, and water rubbing resistance were evaluated using the fine round core.

<<Evaluation>>

<Viscosity>

The viscosities of the prepared oil-based ink compositions for writing instruments were measured using an EL-type viscometer and a rotation rate of 100 rpm.

<Coefficient of Friction of the Coated Film>

Using a bar coater, a 3 μm-thick coated film of each ink was prepared on a PP film, and using a cotton swab, the coefficient of friction of each coated film prepared on the PP film was measured by a surface measuring instrument (HEIDON-14D, Shinto Scientific Co., Ltd.) with a load of 100 g, a moving rate of 3.3 m/min, and an angle of 90°.

<Writability>

Marks written on a polypropylene (PP) film and a glass surface using the prepared felt-tip pen were visually examined for cissing of the marks. The evaluation criteria were as follows.

Excellent: No cissing was found on the written marks.
Poor: Cissing was found on the written marks.

<Anti-Rubbing Characteristics>

The written marks obtained in the writability test were dried. The written marks on the PP film were rubbed by moving Kimwipes paper loaded with a 500 g weight five times to evaluated anti-rubbing characteristics.

Regarding marks made on a glass surface, the anti-rubbing characteristics of the marks were evaluated similarly to the above, except that the weight was 1 kg, and Kimwipes paper was moved 10 times.

The evaluation criteria were as follows:

Excellent: The marks were not removed at all upon inspection after the test.

Good: The marks were slightly removed, but mostly remained present upon inspection after the test.

Poor: The marks were almost completely removed upon inspection after the test.

<Water Rubbing Resistance>

The water rubbing resistance of marks were evaluated by immersing the marks in water for 30 minutes, then removing the marks from water and evaluating the anti-rubbing characteristics while the marks were still wet using the above method for anti-rubbing.

Results are shown in Table 1.

TABLE 1

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Composition | | Type of Colorant | A | A | B | B | A | B | C | A |
| | Content | Colorant | 12.5 | 12.5 | 3.5 | 3.5 | 12.5 | 3.5 | 7.5 | 12.5 |
| | | Resin | 5 | 5 | 5 | 5 | 5 | 5 | 5 | 5 |
| | | Silicone (solid content) | 1 | 3 | 3 | 6 | 3 | 3 | 3 | 0 |
| | | Ethanol | 61 | 53 | 80 | 77 | 62 | 80 | 79.5 | 65 |
| | | PGM | 20.5 | 26.5 | 8.5 | 8.5 | 17.5 | 8.5 | 5 | 17.5 |
| | Details of Silicone | Type | A | A | B | B | C | D | E | — |
| | | Total number of hydroxy groups at both ends | Not less than 3 | Not less than 3 | Not less than 3 | Not less than 3 | 1 | 0 | 1 | — |
| Results | | Viscosity (mPa·s) | 2.7 | 3.2 | 1.7 | 3.5 | 2.6 | 1.9 | 2.2 | 2.2 |
| | | Film coefficient of friction | 0.095 | 0.088 | 0.117 | 0.124 | 0.134 | 0.297 | 0.263 | 0.661 |
| | Writability | PP | Excellent | Excellent | Excellent | Excellent | Poor | Excellent | Excellent | Excellent |
| | | glass | Excellent | Excellent | Excellent | Excellent | Excellent | Excellent | Excellent | Excellent |
| | Anti-rubbing | PP | Excellent | Excellent | Excellent | Excellent | — | Excellent | Good | Good |
| | | glass | Excellent | Excellent | Excellent | Excellent | Poor | Excellent | Good | Excellent |
| | Water nibbing resistance | PP | Excellent | Excellent | Excellent | Excellent | — | Excellent | Poor | Excellent |
| | | glass | Excellent | Excellent | Excellent | Excellent | Excellent | Poor | Excellent | Poor |

Colorant A: Black dye (Valifast Black 3830, Orient Chemical Co., Ltd.)
Colorant B: Red dye (Spilon Red C-GH, Hodogaya Chemical Co., Ltd.)
Colorant C: Blue dye (Valifast Blue 1613, Orient Chemical Co., Ltd.)
Silicone A: Hydroxy-containing polyether-modified polydimethylsiloxane (BYK-SILCLEAN 3720, BYK)
Silicone B: Hydroxy-containing polyether-modified polydimethylsiloxane (Protect 5000N, TEGO)
Silicone C: Double-end carbinol-modified-ROH (KF-6003, Shin-Etsu Chemical Co., Ltd.)
Silicone D: PEG-32 methyl ether dimethicone (KF-6004, Shin-Etsu Chemical Co., Ltd.)
Silicone E: Double-end polyether-modified-R(C2H4O)a(C3H6O)bH (X-22-4952, Shin-Etsu Chemical Co., Ltd.

From Table 1, it can be confirmed that the coated films of Examples 1 to 4 formed from the oil-based ink compositions each comprising a polydimethylsiloxane having a polyether-modifying group on each end thereof and having a total number of hydroxy groups of the polyether-modifying groups of not less than 3 had a coefficient of friction of not more than 0.13. Additionally, it can be confirmed that the oil-based ink compositions of Examples 1 to 4 having the aforementioned coefficient of friction demonstrated good writability and anti-rubbing characteristics after writing.

REFERENCE SIGNS LIST

10 oil-based ink composition for writing instruments
12 polydimethylsiloxane
12a main chain
12b polyester end group
14 adhered component
20 writing surface

The invention claimed is:

1. An oil-based ink composition for writing instruments, comprising
   a colorant, a resin, an organic solvent, and a friction reducing agent,
   wherein a coated film formed by applying 3 μm of the oil-based ink composition for writing instruments on a polypropylene film followed by drying has a coefficient of friction of 0.13 or less as measured with a load of 100 g, a moving rate of 3.3 m/min, and an angle of 90°,
   wherein the friction reducing agent is a polydimethylsiloxane, and
   wherein the polydimethylsiloxane has polyether-modifying groups on both ends, and
   the total sum of hydroxy groups of the polyether-modifying groups is 3 or more.

2. The oil-based ink composition for writing instruments according to claim 1, wherein at least one of the polyether-modifying groups has a multi-branched molecular skeleton.

3. The oil-based ink composition for writing instruments according to claim 1, wherein the content of the polydimethylsiloxane is 0.005 to 10 mass % relative to the total mass of the oil-based ink composition for writing instruments.

4. A writing instrument comprising at least an ink storage portion, a writing portion, and a holding portion,
   wherein the oil-based ink compositions for writing instruments according to claim 1 is stored in the ink storage portion.

\* \* \* \* \*